Patented Aug. 10, 1926.

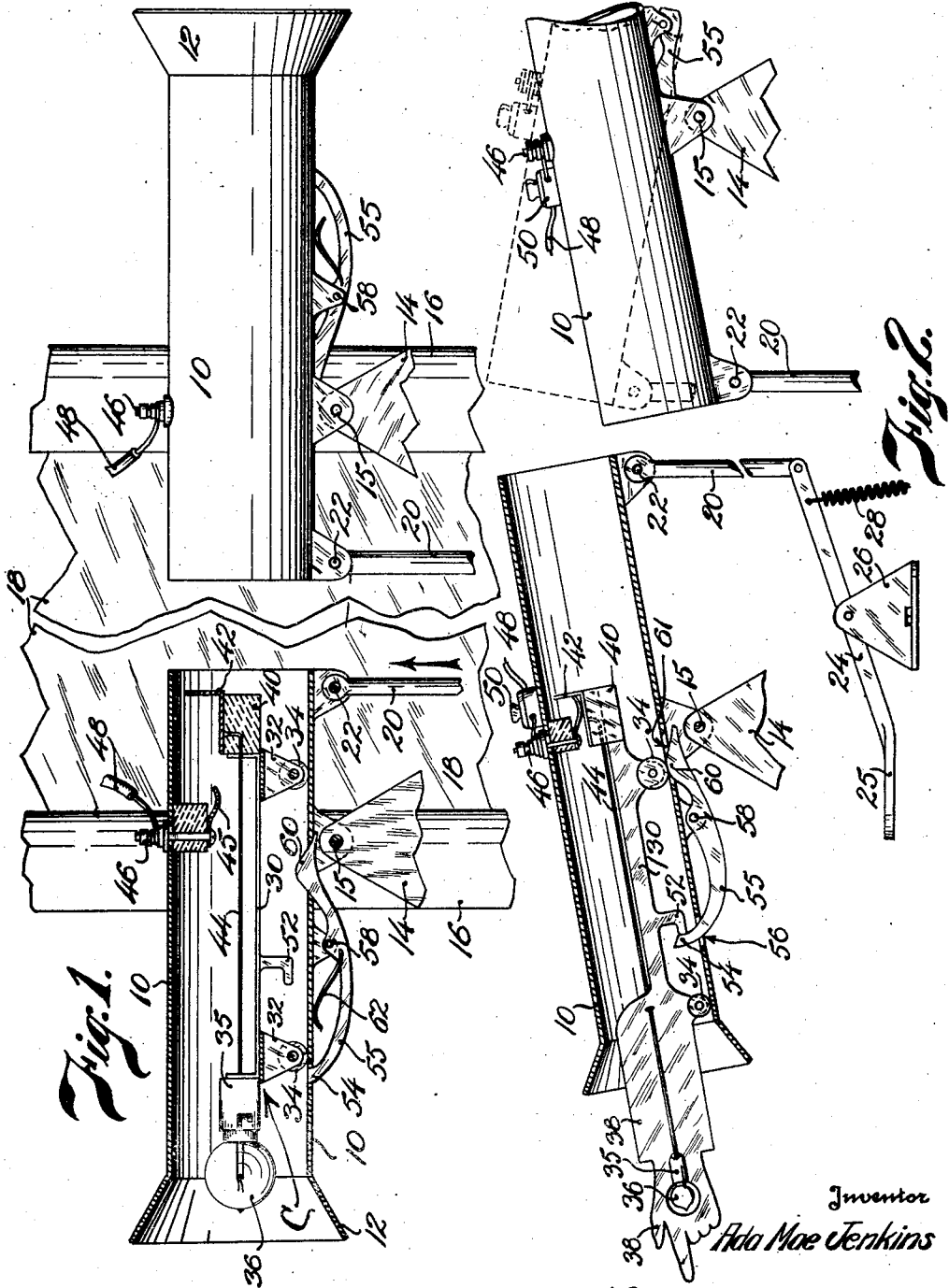

1,595,406

UNITED STATES PATENT OFFICE.

ADA MAE JENKINS, OF DENVER, COLORADO.

ILLUMINATED SIGNALING DEVICE.

Application filed November 17, 1922. Serial No. 601,514.

The object of this invention is to provide a signaling device which will be simple in construction, may be easily operated, and will be efficient in operation.

Briefly the invention comprises a member in the form of a track or guide which may be hollow to serve as a housing, in which there is mounted a movable signal. Said member or housing is adapted to be swung about a pivot to elevate one end or the other of the same, so that the signal may move under influence of gravity to expose itself and to return into said housing at the will of the operator. The signal may include an illuminating member, an electric circuit being closed through movement of the signal, and automatically operated means preferably will be provided for limiting the amount of movement of the signal.

In the accompanying drawings wherein certain embodiments of the invention are disclosed, Fig. 1 represents a pair of the signals mounted on opposite sides of an automobile windshield for signaling in opposite directions;

Fig. 2 shows a slight modification thereof with the signal housings set in such positions of inclination as to extend one signal for service and to cause the other to return to inoperative position.

In the drawings there is shown for each signal unit a tubular housing 10 which may have a flared outer end 12 for spreading light rays outward from the end of the tube if desired or to serve as a guard. The housing 10 is mounted upon a bracket 14 or the like by means of a pivot 15, this bracket being conveniently carried in any desired manner as by mounting upon the post 16 of the windshield 18 of an automobile. A rod 20 is connected at 22 to the inner or rear end of the housing 10, said rod being operated through the medium of a lever 24 having a treadle 25. The lever 24 pivots upon a base 26, and when the treadle is depressed, the rod 20 elevates the inner end of housing 10 thereby swinging the outer end downward about the pivot 15. This tilting of housing 10 allows a signaling carriage C to roll outward from the housing under influence of gravity. When the treadle is released, a spring 28 connected to lever 24 returns the same and lowers the inner end of the housing 10 as indicated at the right of Figure 2 so that carriage C rolls back into the housing.

Carriage C carries the signalling element and is composed of a bar or other body member 30 in the form of Fig. 1, this bar carrying small trucks or brackets 32 provided with rollers which rest upon the bottom of housing 10 and support the carriage, these rollers 34 being in such numbers as may be required. The forward end of bar 30 carries a socket 35 for an electric globe 36 which is the signal element in this form. In the form of Fig. 2, the body member 130 has a suitable extension 38 which may be in the form of a hand which serves as at least a portion of the signal, the socket 35 and globe 36 being carried thereby if desired in the manner shown. In each instance the rear end of body member 30 or 130 carries an insulating block 40 provided with a contact 42 from which an electric conduit 44 leads to the socket 35. Contact 42 on block 40 is adapted to engage a contact 45 carried by an insulated terminal 46 on the housing 10 to which an electric conductor 48 leads. If desired, a switch 50 may be interposed in the form of Figure 2 so as to eliminate the globe 36 as a signal element when preferred.

The bar or body 30 or 130 carries a depending stop 52 adapted to engage the end 54 of a lever 55 which projects through an opening 56 in casing 10, said lever 55 being pivoted at 58 on a lug on the casing. The other end 60 of lever 55 normally projects through an opening 61 in casing 10 and lies in the path of the rear roller 34. A spring 62 may be employed to maintain this position of the lever as shown in Fig. 1, or the lever may be sufficiently counterweighted for the purpose as indicated in Fig. 2. In either event the weight of the rear end of carriage C is sufficient to depress the end 60 of lever 55 when the carriage moves outward, the rear roller remaining on said end when in outermost position. As the rear roller 34 rides onto end 60 the end 54 is elevated into the path of the stop 52 whereby outward movement of the carriage is limited. This travel of the carriage takes place when the treadle 25 is depressed to lower the outer end of the housing 10 and the carriage. When the treadle is released the spring 28 returns the inner end to lowermost position and the carriage rolls back into the housing as at the right of Fig. 2. As soon as the roller 34 disengages the end 60 the forward end 54 of lever 55 is withdrawn from the path of the forward rollers 34 to permit free return of the carriage. Fig. 1 shows the parts in an intermediate position. The contacts 42 and 45 provide for closing the circuit to the lamp 36. The specific form of construction of contact 42 shown acts as a safety stop to limit motion of the carriage should the lever 55 fail to operate for any reason whatever.

By providing a pair of the devices as shown signals may be given selectively from opposite sides of a car or the like.

I claim:

1. In a signal a tiltable housing, means to tilt said housing and a gravity operated longitudinally movable signaling member in said housing adapted to project from the housing.

2. In a signal, a tiltable housing, means for tilting the housing, a gravity operated signaling member longitudinally movable to and from said housing as the same is tilted and means to limit movement of said member.

3. In a signal, a tiltable housing, means for tilting said housing, a gravity operated signaling member longitudinally movable to and from said housing as the same is tilted, and means actuable by said member as it moves for limiting outward movement of the member.

4. In a signal, a tiltable housing, means for tilting the same, a gravity operated signaling member bodily movable longitudinally to and from said housing as the same is tilted, and means actuable as said member moves for illuminating the same for signaling purposes.

5. In a signal, a tiltable member, means for tilting the same, and a gravity operated signaling element longitudinally movable to and from signaling position on said member as the latter is tilted and adapted to be projected from said member.

6. In a signal, a tiltable member, means for tilting the same, and a gravity operated signaling member actuable by tilting the other member slidable along the tiltable member to and from signaling position and adapted to be projected beyond said tiltable member.

7. In a signal, a member adapted to be placed in an inclined position, means to incline the same and a gravity operated signaling element longitudinally movable upon the inclined member and adapted to be projected from said member.

8. In a signal, a member adapted to be placed in inclined position, a gravity operated signaling member movable upon the inclined member, a movable element engageable by a portion of said signaling member as it moves, and a part on said element movable thereby into the path of the signaling member when the element is engaged for limiting movement of the signaling member.

In testimony whereof I affix my signature.

ADA MAE JENKINS.